Jan. 31, 1939.　　　S. G. SMITH　　　2,145,461
RING FORMING MECHANISM
Filed Sept. 13, 1937　　4 Sheets-Sheet 3
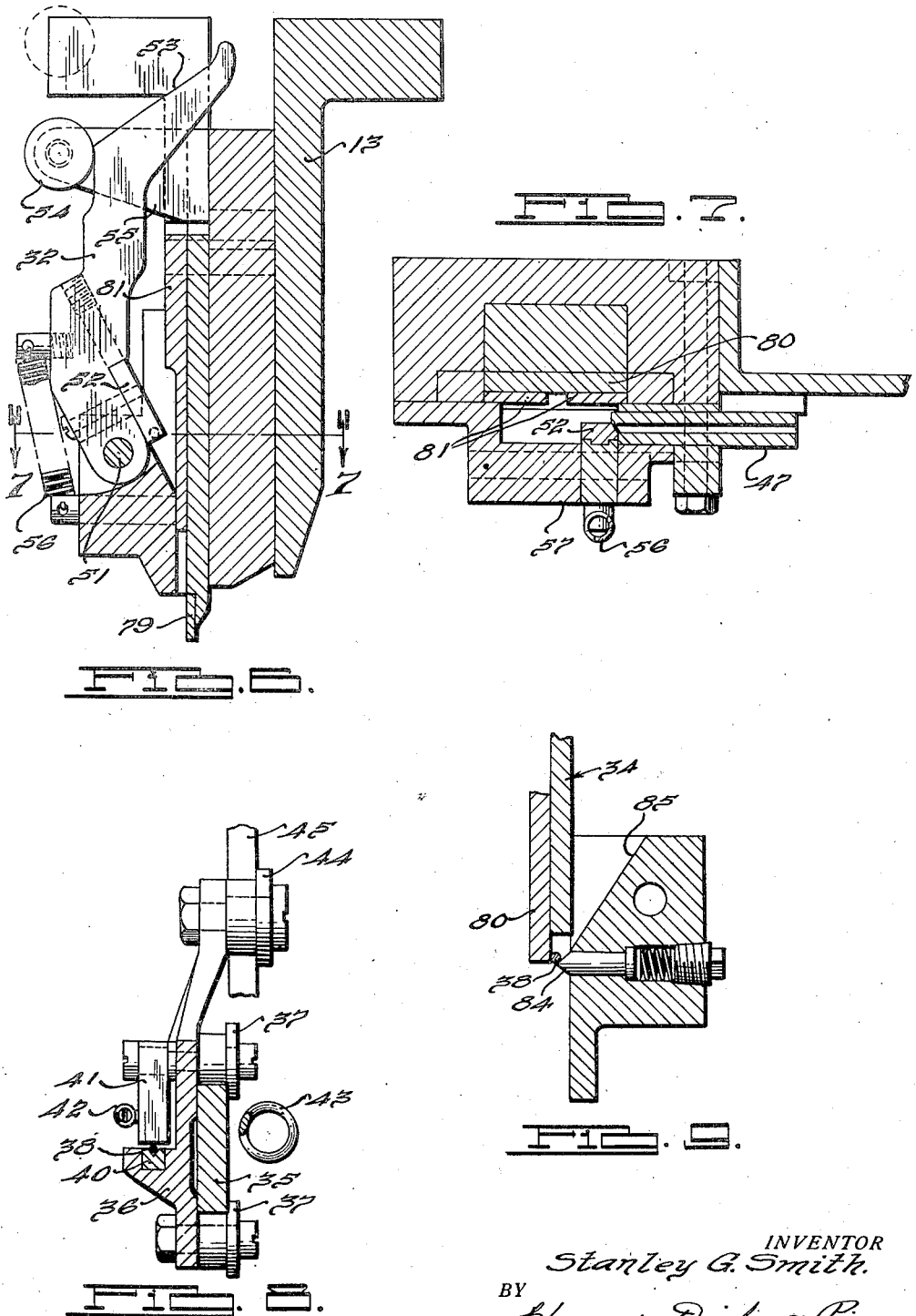
INVENTOR
Stanley G. Smith.
BY Harness, Dickey & Pierce.
ATTORNEYS.

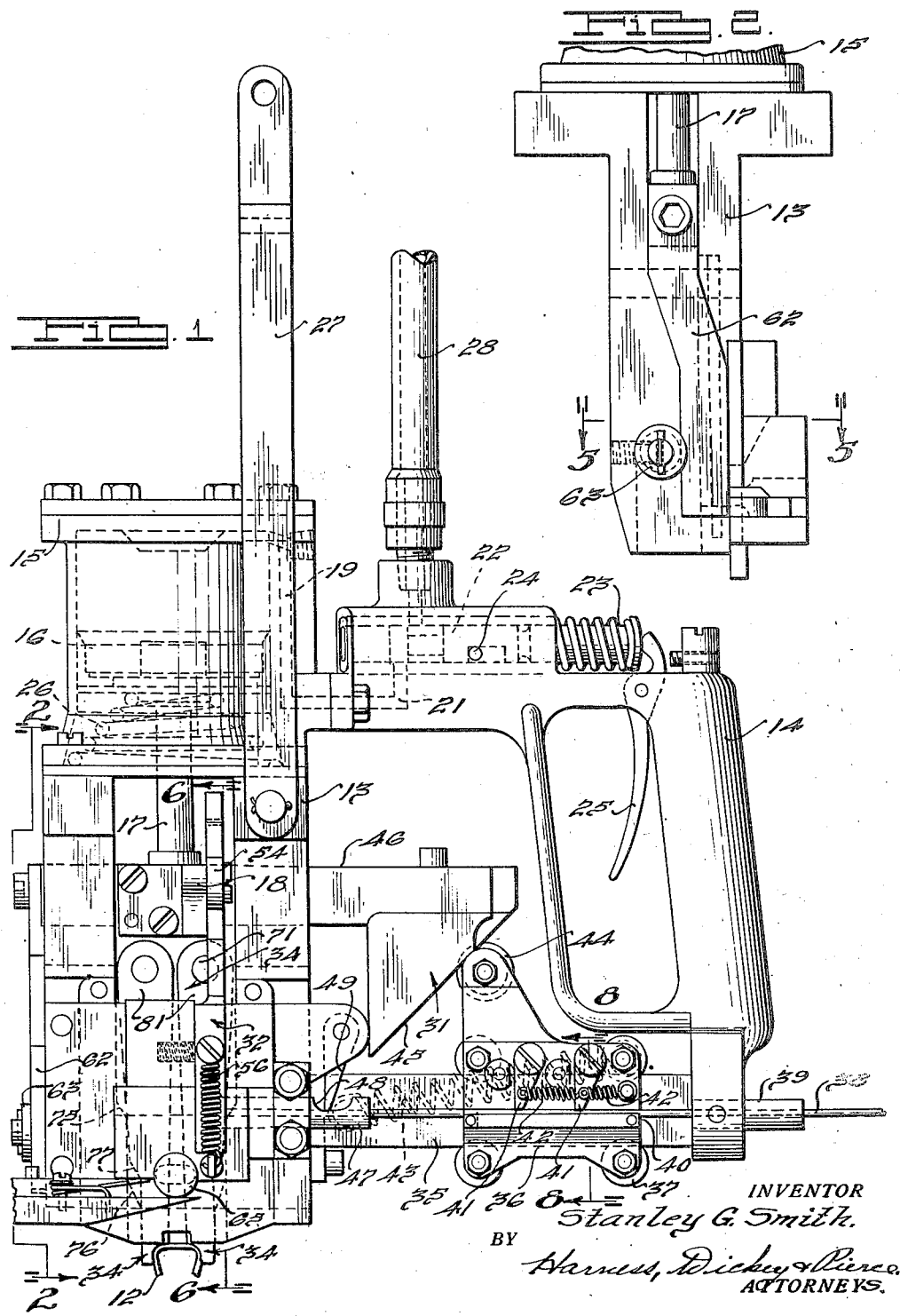

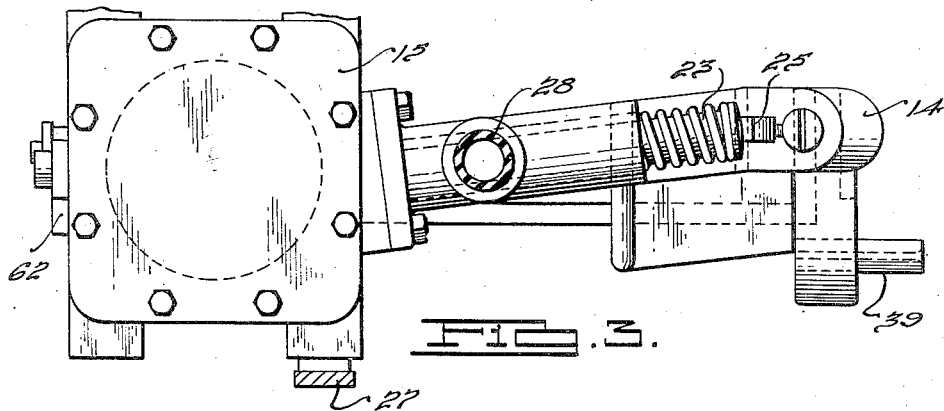
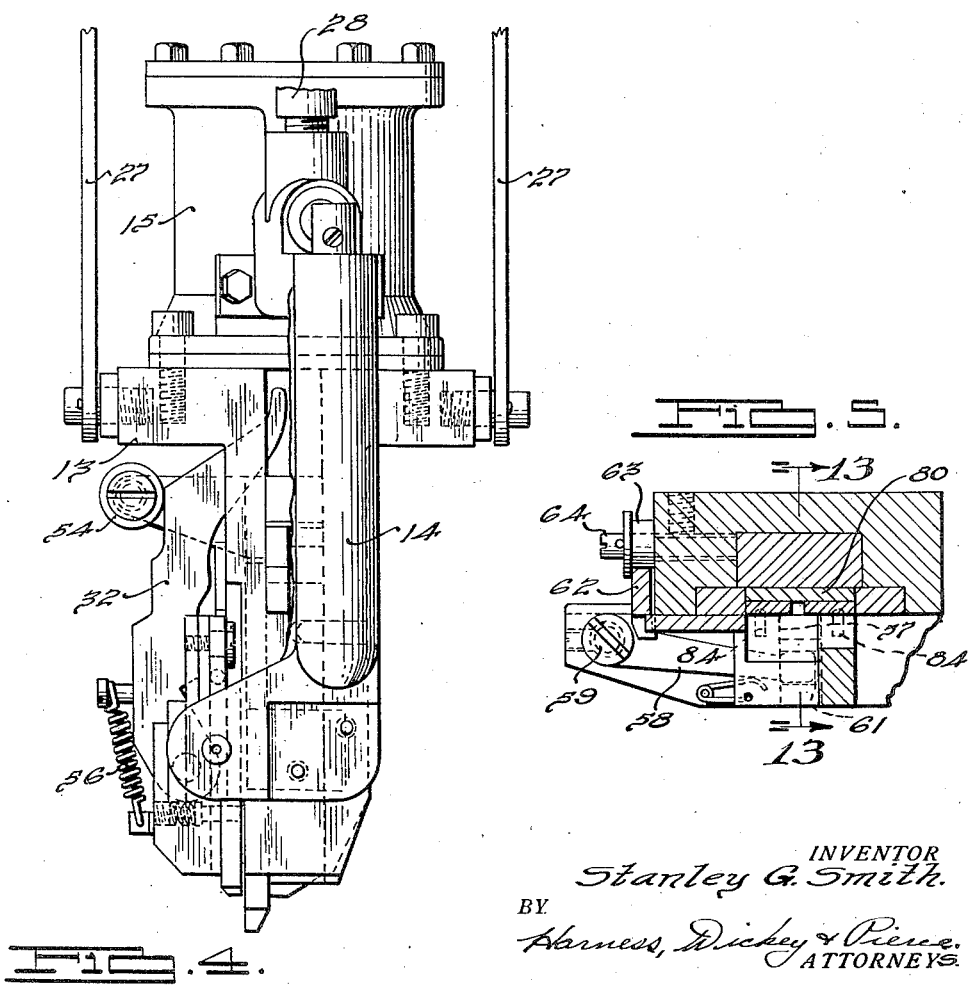

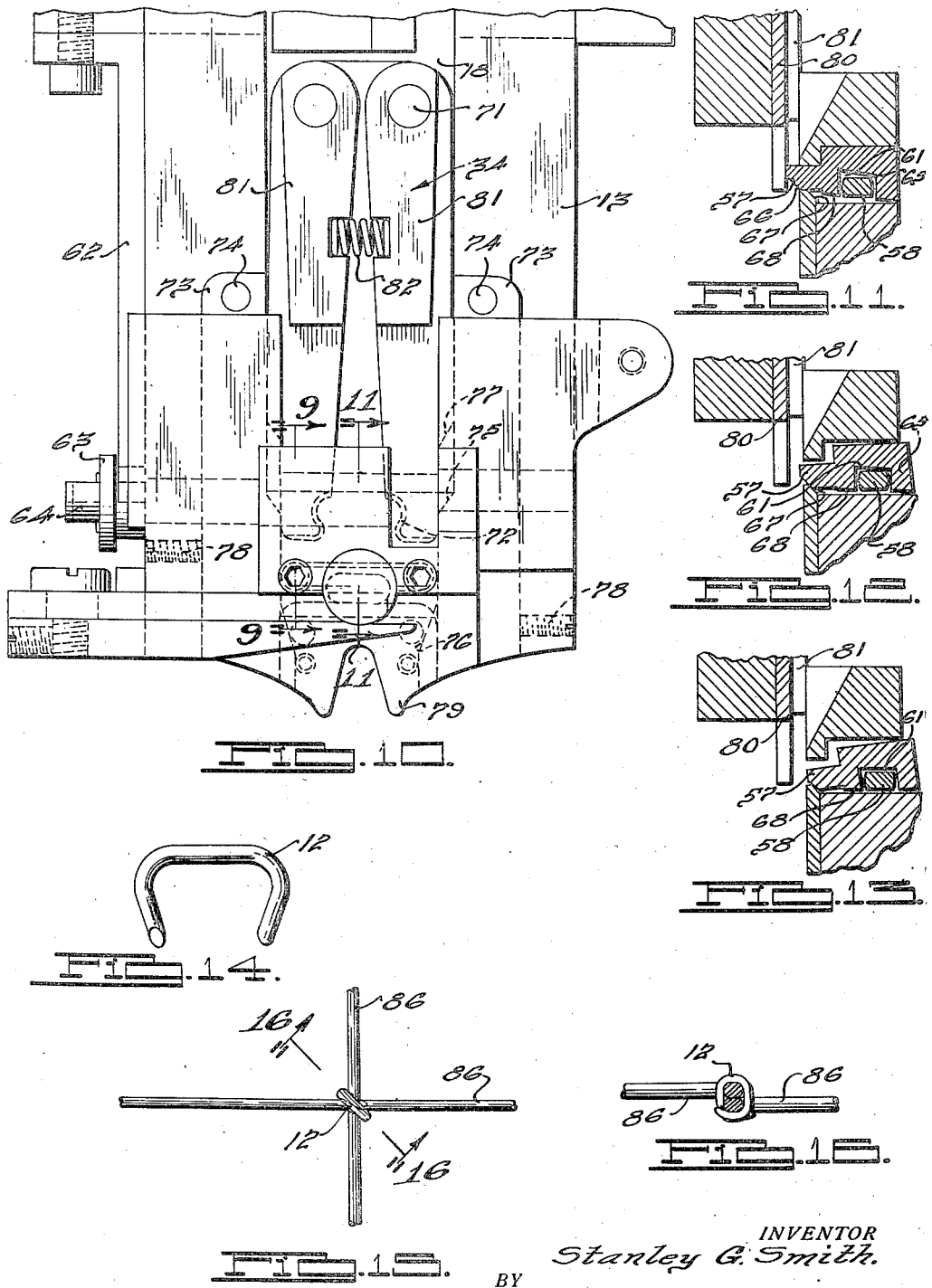

Patented Jan. 31, 1939

2,145,461

UNITED STATES PATENT OFFICE 2,145,461

RING FORMING MECHANISM

Stanley G. Smith, Detroit, Mich., assignor to The Murray Corporation of America, Detroit, Mich., a corporation of Delaware Application September 13, 1937, Serial No. 163,630

11 Claims. (Cl. 140—55)

My invention relates to a method and means for forming and applying wire rings and particularly to a device and method for feeding wire to an anvil where it is cut, formed by jaws which clinch the element about members to be secured.

It is recognized that apparatus has been employed heretofore for cutting and forming wire and for applying the wire to elements which are to be held together. The device embodying the present invention comprises an improved method for forming clinching elements, known in the art as "hog rings" and clinching the "rings" about wires or other members which are to be secured together. The device is compact in form and extremely portable and is intended for suspension over the members which are to be secured together and operated as a clinching device. During the clinching of one "hog ring", the device operates to sever a length of wire which is delivered to an anvil when the jaws are retrieved from clamping the prior ring.

The device embodies in general, a hydraulic cylinder which operates a piston to move a slide downwardly on which a pair of arms are pivotally swung. The arms bend a length of wire previously cut and delivered to an anvil about the anvil by a further movement of the arms. The "hog ring" thus formed is carried by the arms to the members which are to be joined together. The further movement of the arms produces a clinching of the "hog ring" and the severance of another length of wire is delivered to the anvil upon the retraction of the arms and slide by the piston. During the retrieving of the piston, another length of wire is fed into the cutting dies in position to be operated on by the dies when the device is again operated.

Accordingly, the main objects of my invention are; to provide a portable device for forming "hog rings" and for clinching said rings about members which are to be joined together; to provide a "hog ring" forming device with cutting dies and an anvil for cutting and forming "hog rings" and with clinching jaws for clinching the rings so formed; to provide a clinching device with means for forming a "hog ring" during the time another length of wire is cut; to automatically feed a length of wire to the cutting dies of the device upon the retractive movement of the forming elements; to provide a ring forming device which is actuated through the movement of a trigger to cut a length of wire to form a ring therefrom and to clinch a ring about members; and in general to provide a portable ring forming and clinching device which is simple in construction, positive in operation, and economical of manufacture.

Other objects and features of novelty of my invention will be specifically pointed out or will become apparent when referring for a better understanding of my invention to the following description taken in conjunction with the accompanying drawings, wherein:

Figure 1 is a view in side elevation of a ring forming and clinching device embodying features of my invention;

Fig. 2 is a front broken view of the structure illustrated in Fig. 1, as viewed on the line 2—2 thereof;

Fig. 3 is a top plan view of the structure illustrated in Fig. 1;

Fig. 4 is a rear view of the structure illustrated in Fig. 2;

Fig. 5 is a sectional view of the structure illustrated in Fig. 2, taken on the line 5—5 thereof;

Fig. 6 is an enlarged sectional view of the structure illustrated in Fig. 1, taken on the line 6—6 thereof;

Fig. 7 is a sectional view of the structure illustrated in Fig. 6, taken on the line 7—7 thereof;

Fig. 8 is an enlarged sectional view of the structure illustrated in Fig. 1, taken on the line 8—8 thereof;

Fig. 9 is an enlarged sectional view of the structure illustrated in Fig. 10, taken on the line 9—9 thereof;

Fig. 10 is an enlarged broken view of the structure illustrated in Fig. 1, with the piston in retracted position;

Fig. 11 is an enlarged broken sectional view of the structure illustrated in Fig. 10, taken on the line 11—11 thereof;

Fig. 12 is a view of the structure illustrated in Fig. 11 with the anvil in partially retracted position;

Fig. 13 is a view of the structure illustrated in Fig. 11 with the anvil in completely retracted position;

Fig. 14 is an enlarged view in elevation of a ring formed by the device illustrated in the foregoing figures;

Fig. 15 is a view of a pair of wires joined by the rings illustrated in Fig. 14 by the clinching elements of the device illustrated in Fig. 1; and Fig. 16 is an enlarged sectional view of the structure illustrated in Fig. 15 taken on the line 16—16 thereof.

The device illustrated in Fig. 1 is shown with the piston near the end of its stroke having a "hog ring" in a position to engage members which are to be secured together when the ring is clamped thereabout during the remaining portion of the stroke of the piston. The device embodies a housing 13 to which a control handle 14 and a cylinder 15 is secured. The cylinder encompasses a piston 16 having a piston rod 17 tion. A roller 63 guides the rod 62 and is mounted on an eccentric shaft 64 so that it may be adjusted to position the rod 62 relative to the arm 58.

As illustrated more particularly in Figs. 11, 12, and 13, the anvil 37 is a projection of a cylinof wires 86 which are to be secured together, are disposed within the groove of the guide element 78 or the device may be moved to have the groove placed over the junction of the wires at the point at which they are to be secured together. The trigger 25 is then actuated to have the air or other fluid pass from the conduit 28 to the top of the cylinder 15. The pressure accumulating within the cylinder will force the piston 16 downwardly to move the slide 18 downwardly therewith.

The downward movement of the slide actuates the arms 34 to engage the wire and bend it about the mandrel 57 which is disposed in a position as illustrated in Fig. 11. The grooves in the ends of the gripping jaws 72 of the arms will cause one arm of the wire to be moved frontwardly, while the other end is moved rearwardly to produce the twist in the resulting ring formed thereby. As the wire is substantially bent into the shape as illustrated in Fig. 14, the rod 62 will engage the arm 58 to cause the arm to move in a clockwise direction to retrieve mandrel 57 which moves downwardly during the time it is being retrieved so as to move along with the arms 34 during such retrieving movement. Through this combined movement, the anvil is available to have the bending of the wire completed before it is withdrawn, since such withdrawal occurs during the synchronized downward movement of the anvil and the arms 34.

Prior to the movement of the anvil the surface 77 of the arms engages the cam surface 75 of the element 73 to cause the arms to move inwardly to twist the wire about the anvil into the form as illustrated in Fig. 14. The anvil is retrieved in the manner above set forth and the arms 34 continue to move downwardly while retaining the ring until the ring 12 is disposed about the wires 86 at which time the cam surfaces 77 will engage the additional cam surfaces 76 on the element 73 to cause the arms to move inwardly to form the ring about the wires as illustrated more sepcifically in Figs. 15 and 16.

During the downward movement the cam 45 moves the carriage 36 outwardly on the track 35 to have the fingers 41 thereof engage and clamp a new section of the wire 38 and to tension the spring 43. At the same time the cam surface 57 of the shearing device 32 was engaged by the roller 54 to move the arm inwardly to effect a shearing operation.

After the clinching operation is completed, the operation releases the handle 25 to permit the air in the cylinder to be released through the opening 24 so that the piston 16 may be retrieved by the spring 26. The retrieving of the piston moves the slide 18 upwardly which permits the arms 34 to separate under the bias of the spring 82, moves the cam surface 45 upwardly out of engagement with the roller 44, moves the rod 62 upwardly out of engagement with the arm 58, and moves the roller 54 upwardly out of engagement with the cam surface 53 to permit the arm 58 to move the anvil back into operating position below the wire 38 which was cut on the down stroke and which is now supported on the pins 84. The shearing device 32 has the arm 52 thereof moved in counter-clockwise direction by the spring 56 out of the path of movement of the wire 38 which is immediately advanced by the forward movement of the carriage 35 under the bias of the springs 43. The device is again in a condition to be actuated to form and clinch a section of wire cut during the described operation, about additional members 86 which are to be secured together.

The device thus constructed is simple yet positive in operation when forming a section of wire into U-shape and clinching the wire to members to be secured together all during the single stroke of the device. During the stroke an additional section of wire is sheared and disposed adjacent to the position in which it will be operated on when the device is next employed. The anvil is unique in that it moves downwardly along with the forming element during the time that it is retrieved so as to be out of position of the forming arm after the forming operation. The simple and portable device thus formed not only eliminates the separate machine heretofore utilized for forming the rings but also the mandrel on which the rings were assembled and secured to the tool which effected the clinching operation. Where the device is too heavy for an operator to readily handle, it may be suspended from an arm, bracket, or ceiling and through the movement of the work, the device or both, effect the engagement between the receiving element of the tool and the work prior to the operation of the device.

While I have described and illustrated but a single embodiment of my invention, it will be apparent to those skilled in the art that various changes, omissions, additions, and substitutions may be made therein without departing from the spirit and scope of my invention, as set forth in the accompanying claims.

I claim as my invention:

1. A forming and clinching device including, in combination, a slide, means for reciprocating said slide, means for delivering wire to said device, means for shearing said wire, an anvil, arms for forming the wire about the anvil having means for deflecting the ends in opposite directions, means for moving said anvil to and from the path of movement of said forming means, and means on said slide for operating said delivering, shearing, forming, and anvil moving means during one stroke of said slide to form a U-shaped staple with the ends of the legs thereof disposed out of the plane of each other and the base of the staple.

2. A forming and clinching device embodying a slide, means for reciprocating said slide, means for delivering wire to said device, means for shearing said wire, an anvil, arms carried by said slide for forming the wire about said anvil having means for deflecting the ends in opposite directions, means for moving said anvil to and from the path of movement of said forming means, and means for clinching said wire about elements to be secured after the anvil has been moved from said path, said delivering means, said shearing means, said forming means, and said anvil moving means all being actuated by the movement of the slides in a single direction to form a U-shaped staple with the ends of the legs thereof disposed out of the plane of each other and the base of the staple, which legs overlap when clinched.

3. In a ring forming and clinching device including, in combination, arms for forming a section of wire about an anvil and for clinching the wire so formed about members to be secured together, an anvil, means for moving said anvil to and from the path of movement of said forming and clinching arms, cam means for actuating said arms to effect the forming operation, and additional cam means for actuating said arms to effect the clinching operation.

4. In a ring forming and clinching device including, in combination, arms for forming a section of wire about an anvil and for clinching the wire so formed about members to be secured together, an anvil, means for moving said anvil to and from the path of movement of said forming and clinching arms and for moving said anvil downwardly during the movement of said slide, and means for moving said arms toward each other about said anvil to bend said wire before the simultaneous movement of said anvil and arms.

5. In a ring forming and clinching device including, in combination, arms for forming a section of wire about an anvil and for clinching the wire so formed about members to be secured together, an anvil, means for moving said anvil to and from the path of movement of said forming and clinching arms, means on said arms for holding said wire and for deflecting the ends thereof in opposite directions during the bending operation, means for operating said arms and said anvil during a single stroke of said slide, and pressure actuated means for moving said slide.

6. In a forming and clinching device including, in combination, means for delivering wire to said device, means for shearing said wire, an anvil, means for forming the wire about said anvil, and means for moving said anvil to and from the path of movement of said forming means and downwardly with said forming means after said forming operation.

7. In a forming and clinching device including, in combination, means for delivering wire to said device, means for shearing said wire, an anvil, means for forming the wire about said anvil, means for moving said anvil to and from the path of movement of said forming means and downwardly with said forming means, means for twisting the ends of said wire during the forming operation, and means for actuating said forming means to clinch said formed wire about members to be secured together with the ends in overlapping relation.

8. In a ring forming and clinching device, including, in combination, means for forming and clinching a section of wire about members to be secured together, means for actuating said forming and clinching means, a wire delivering element embodying a carriage movable to engage a new section of wire by said actuating means, a clamp for retaining the wire in position in the device, a clamp on said carriage for securing said wire, and means for moving said carriage to advance the wire within the device, means for shearing a section of said wire, an anvil, arms engaging said wire for bending it about said anvil, means on said arms for deflecting the ends of said wire in opposite direction when being bent, and means for further operating both of said arms toward each other to clinch said bent wire with the ends in overlapping relation.

9. In a ring forming and clinching device including, in combination, means for forming and clinching a section of wire about elements to be secured together, an anvil about which the wire is formed, means for moving said forming means, means for moving said anvil out of the path of movement of said forming and clinching means during the time it is moving downwardly with said forming means, said means being actuated by said moving means, cam means operating said forming means toward each other to form the wire about said anvil, and additional cam means for moving both of said arms toward each other to clinch said formed wire.

10. In a ring forming and clinching device, including, in combination, an anvil, means for forming a wire about said anvil, means for moving said forming means toward and beyond the anvil, means for moving said anvil downwardly and rearwardly of said forming means during the time said forming means is moving downwardly therewith, and means for moving said forming means toward said anvil to form the wire thereabout, and additional means for moving said formed wire to produce a clinching operation with the ends overlapping.

11. A ring forming and clinching device including, in combination, an anvil movable longitudinally and downwardly, means for moving said anvil, means for forming a wire about said anvil before it is moved, and means for moving said forming means and said anvil in synchronism.

STANLEY G. SMITH.